United States Patent Office 3,434,851
Patented Mar. 25, 1969

3,434,851
RUSTPROOFING COMPOSITIONS
Charles R. Miller, Ashland, Ky., assignor to Ashland Oil & Refining Company, Houston, Tex., a corporation of Kentucky
No Drawing. Filed July 7, 1965, Ser. No. 470,241
Int. Cl. C09d 5/08; C08h 17/06, 13/00
U.S. Cl. 106—14
23 Claims

ABSTRACT OF THE DISCLOSURE

Coating compositions for protecting metal surfaces against corrosion comprising a water-insoluble metal soap of a waxy hydrocarbon oxidate, an asphaltic bitumen, a water-insoluble hydrocarbon-based corrosion inhibitor, an organophilic modified clay and a solvent.

---

This invention relates to methods and coating compositions for inhibiting and even preventing rust. More particularly, it pertains to methods and coating compositions that are especially useful for protecting vehicle underbodies from corrosion.

The application of coating compositions to the underbodies of automobiles and other vehicles is a well-established practice. Consumer demand for automotive undercoatings is based upon the popular misconception that undercoating compositions generally give long-term corrosion protection, promising longer automobile body life. Tragically, many if not most of the undercoating compositions that are commercially available today offer good sound deadening, but only a slight degree of corrosion protection. Such compositions are base principally on asphalt cutbacks, compositions comprising oxidized or blown asphalt diluted or partially dissolved with a volatile solvent. Blown or oxidized asphalt often has poor weather resistance, and the coatings produced with such compositions tend to check and develop cracks that expose the metal under the coating in an average of about 18 months driving. When this condition occurs, fresh water and water containing salt used in the melting of snow and ice on roadways can find its way into the cracks as a result of being splashed up by the wheels of the vehicle. When the fresh or salt-containing water seeps into the cracks, they have the effect of holding the water against the metal, rather than allowing it to drain away and dry naturally. Prolongation of the contact between the metal and the water being held in the cracks accelerates the destruction of the underbody. Thus, it is a fact that many of the undercoatings on the market today actually aggravate corrosion problems once they have weathered to a significant extent.

Undercoating compositions based principally on blown or oxidized asphalts have certain other problems. From the standpoint of economy and convenience, the only satisfactory method of applying undercoatings is by spraying. But undercoating compositions principally composed of asphalt had a tendency to spray in an unacceptably stringy fashion during the early development of the art. Later, this problem was cured by incorporating relatively large amounts, e.g., 20%, of natural clay in the undercoating compositions. The clay had the effect of reducing the stringiness of the asphalt. It also improved cold weather metal adhesion and impact resistance, properties in which blown or oxidized asphalt is notably deficient.

Unfortunately, although the clay cured the stringiness problem, it introduced still another problem. It has been found that the presence of relatively large amounts of clay in an automobile undercoating actually causes a transfer of moisture from the outer surface of the coating to the metal coating interface, where the moisture causes corrosion of the metal. This process takes place even when the surface of the coating appears to be in good condition. The clay tends to convey moisture through the coating in a manner which might be likened to the way in which a wick conveys fuel from the fuel reservoir to the burner of a lantern. Thus, the clay is said to "wick" water through the undercoat.

Experience with the above problems and others has shown that an undercoating composition should possess certain attributes in order to be acceptable from the standpoint of quality, economy and ease of application. The composition should discharge from a spray-gun in an even pattern with a minimum of overspray and without the use of higher pressures than are available from the air compressors ordinarily used with spraying equipment. It should discharge smoothly, rather than in the stringy fashion mentioned above. It should be capable of drying to the touch relatively quickly, but should not contain solvents that are so volatile as to create a fire hazard. The composition should be adaptable to application in thick coats without excessive dripping, and yet be sufficiently fluid to penetrate and coat crevices and close-fitting joints in the object to be coated.

The "dried" coating which remains on the metal after the volatile solvent has evaporated should be resistant to the action of brine, in view of the common use of salt on the highways for melting snow and ice. The coating should have considerable impact resistance, so that it is not easily punctured by stones and other objects thrown up against the vehicle underbody by the wheels. It should be resistant to weathering, impervious to water and substantially free of any tendency to absorb moisture, in order to prevent corrosion-inducing moisture and oxygen from initiating rusting beneath its surface. There should be no substantial tendency for the coating to soften and "run" in warm weather or to become brittle and lose its impact resistance in cold weather.

Presently available undercoating compositions and the coatings produced therefrom seem to possess certain of the above characteristics but are deficient in other respects. Indeed, measures that are employed to bring out certain of the desired characteristics definitely have an adverse effect on other attributes of the compositions and coatings. There is, therefore, a need for an improved undercoating composition which may possess all of the above characteristics at the same time.

It is a principal object of this invention to fulfill the aforementioned need. It is a further object to provide compositions and methods for protecting metal surfaces from the action of moisture and salt solutions. Still another object is to provide methods and compositions for covering metal with a protective coating that possesses unusually good resistance to impact without sacrificing corrosion protection. A further object is to provide methods and compositions for covering vehicle underbodies with a thick protective and sound-deadening coating without danger of dripping or stringiness during application and without sacrificing the corrosion protection characteristics of the coating. These and other objects of the invention will be readily apparent to those skilled in the art upon consideration of the descriptions of the invention and of certain preferred embodiments thereof which are set forth hereinafter.

It has been found unexpectedly that the employment of certain ingredients can lead to coatings of excellent application, protection and strength characteristics if such ingredients are employed in certain particular and heretofore unprecedented proportions. Specifically, it has been found that the objects of this invention may be obtained with compositions comprising: a water insoluble metal soap of a waxy hydrocarbon oxidate characterized by an acid number of at least about 20; about 20 to about 75 parts by weight, per hundred parts of said salt, of asphaltic bitumen bodying agent; an effective amount of an oil soluble, water insoluble, strongly polar hydrocarbon-based corrosion inhibitor; a volatile hydrocarbon solvent, the amount of solvent present in said composition being at least as much as is required to produce a semiliquid viscosity in the composition, and about 3% to about 10%, based on the weight of the composition as a whole, of an organophilic modified clay.

In general, the water insoluble soap constituting the first-mentioned component of the compositions of the present invention is derived by oxidizing a waxy hydrocarbon material to produce an acidic product referred to as a waxy hydrocarbon oxidate. The acidic oxidate is then neutralized to produce the desired soap.

Any waxy hydrocarbon or hydrocarbons of a substantially noncrystalline nature may be employed. The waxy hydrocarbons may be obtained from petroleum fractions, such as petroleum distillates or residues, or the waxy hydrocarbons may be synthesized, as by polymerization of olefins or dehydration of long chain aliphatic alcohols. Waxy hydrocarbons from petroleum sources are especially suitable, because of their ready availability and relatively low cost. The desired waxes are smooth, unctious, long-fibered materials. The property of "fiber" is recognized in the grease art and may be observed in a wax by squeezing some wax between two fingers and then spreading them apart. As the fingers spread, fibers or strings of wax stretch out between the fingers and eventually part. Such waxes may be obtained from any suitable petroleum fractions or crudes, such as Pennsylvania crude, East Texas (Ellenburg) crude, Corning crude and the like, according to methods which are already known to persons skilled in the art. Slop, slack, paraffin, plate, malcrystalline and needle waxes are not suitable, however, and should not be used. The presence of oil in the wax, however, is not deleterious. In fact, the waxy hydrocarbon employed in the preparation of the desired oxidate may beneficially contain substantial amounts, e.g., 30–40%, of oil.

The preferred waxy hydrocarbon is petrolatum. Petrolatum or other procedures is partially oxidized to produce a waxy hydrocarbon oxidate. There are various well-known oxidation procedures, such as those involving blowing with air or oxygen at elevated temperatures with or without catalysts. Applicable procedures are disclosed in a variety of U.S. patents, including: 1,863,004, 2,043,923, 2,156,226, 2,186,910 and 2,216,222. These procedures are of course only illustrative of a wide variety of procedures that can be employed.

The product obtained by such partial oxidation is of indefinite and complex composition, but it is known that the product is characterized by the presence of some neutral paraffins, neutralizable acid groups, and hydroxy, keto and ester groups, thus clearly differentiating the product from fatty acids on the one hand and the waxy hydrocarbon starting material on the other. One characterizing feature of waxy oxidates is their acid number, which is indicative of their extent of oxidation. Persons skilled in the art are acquainted with procedures for controlling the acid number of the waxy oxidates and, in accordance with the present invention, the waxy hydrocarbon oxidate should possess an acid number of about 20 to about 50, an acid number of about 20 to about 35 being preferred. An acid number of 28 appears best. Acid numbers higher than about 50, though not definitely excluded, should be employed with caution, because they can lead to soaps which are grainy and less compatible with certain hydrocarbon solvents than those in the 20–50 acid number range.

In order to obtain the soap from the waxy hydrocarbon oxidate, the oxidate is substantially completely neutralized by reacting it with the hydroxide(s), oxide(s), carbonate(s) or other basic compound(s) of any selected metal(s). The resultant material is a water insoluble salt which has been referred to in the art as "wax soap." Among the many basic compounds which may be used to neutralize the acidic waxy hydrocarbon oxidate are the oxides and/or hydroxides of polyvalent metals having water-insoluble hydroxides, such as calcium, barium, magnesium, zinc, iron and lead. Lime is a particularly preferred neutralizing agent.

The recommended procedure for effecting neutralization includes heating the oxidate to a fluid condition. While the heated material is under agitation, the basic compound is added thereto in dry form, e.g., as a fine powder. After allowing sufficient time for the basic compound to be thoroughly mixed into the waxy hydrocarbon oxidate and to react therewith, the mixture may be allowed to cool. If desired, the soap may be mixed prior to cooling with added waxy hydrocarbon material which has not been oxidized, provided the resultant mixture has an acid number of at least 20 and less than 50. Also, in order to facilitate subsequent handling of the soap, whether mixed with additional nonoxidized waxy material or not, the soap may be cut back during or prior to cooling by adding thereto with agitation a portion of the solvent constituting the fourth-mentioned component of the composition of the present invention.

The asphaltic bitumen comprising the second component of the compositions of the invention may be a single material or a blend of materials, and may include asphaltic material(s) of an origin, e.g., from coal tar, petroleum or other sources. Petroleum asphalts are particularly desirable in view of their ready availability. They may be obtained by various procedures during the refinement of crude oils. For instance, the asphaltic bitumen may be obtained from the heavy residual oils produced in fluid catalytic cracking, or it may be obtained from the residue of the distillation of asphaltic crude oils, or it may be obtained from acid tars produced in the treatment of lubricating oils with sulfuric acid, or it may be obtained during the deasphaltizing of lubricating oils with solvents.

The production of asphaltic bitumen from the heavy residual oils produced in fluid catalytic cracking, such oils being known as slurry oils and cycle oils, may be begun by thermally cracking the residual oil. The cracked material is then vacuum reduced. Following vacuum reduction, the material is oxidized by blowing with air, oxygen, oxygen enriched air or other oxygen containing gas, until an asphalt of the desired softening point is obtained.

The production of asphaltic bitumen by distillation from crude oil or topped crude may be carried out under atmospheric pressure or under reduced pressure. The distillation of crude is continued until the residue in the still obtains the desired penetration. Thus a crude oil heated to a temperature of 40 to 50° C. is fed into an evaporator where vapors are flashed off and the residue is stripped with the assistance of superheated steam at 280 to 300° C. The residue, which is the asphaltic bitumen is drawn off from the evaporator through heat exchangers where it is cooled to 160 to 180° C., and thereafter stored.

The recovery of asphaltic bitumen from acid sludges may be obtained by mixing the acid sludge with water, agitating with air and liver steam and thereafter allowing the mixture to settle into three layers. The dilute acid layer settles to the bottom and an oily layer rises to the top, while the middle layer consists of acid tars. The top and bottom layers are removed and the tar acid is further washed with water and agitated with steam and air until all the acid has been removed from the tar. The tar is then heated with superheated steam until the residual pitch has the desired penetration or softening point. If desired, the tars from the middle layer may be admixed with slaked lime to neutralize the acids and thereafter the asphaltic bitumen recovered.

Asphaltic bitumen can be removed from residual oils by the addition of low-boiling hydrocarbons which cause the precipitation of asphaltic materials as a lower layer containing a small amount of the solvent. Thus an oil may be dispersed in butane and heated under pressure. The mixture may then be treated with a solvent such as propane or ethane until the asphaltic material is precipitated. The quality of the asphaltic bitumen thus produced depends upon the nature of the residual oil, the solvent used and other factors.

Asphaltic bitumens obtained by any of the above processes as well as by any other suitable means and source may be used as the base component of the coating composition of this invention. Also, it should be understood that pseudo-asphaltic materials which are asphaltic in character but which are not truly "asphalts," may be employed, and for the purposes of this disclosure, mixtures of true asphalts and such pseudo-asphaltic materials are included within the meaning of the term asphaltic bitumen. Examples of such pseudo-asphaltic materials are asphaltenes, asphaltities, various resins and pitches.

The asphaltic bitumen may be blown if desired. Also, as is well known to persons skilled in the art, various combinations or successions of blowing and reduction treatments may be applied to asphalts to advantageously modify their properties. In this regard, it is known that by suitable selection of the consistency of the asphalt oxidizing base and by adjustment of the temperature and rate of introduction of the oxidizing agent, the susceptability of the product to temperature change, its toughness and pliability at lower temperatures and its resistence to shock can be altered in an advantageous manner.

The asphaltic bitumen may suitably be an asphalt which is characterized by having a softening point (ring and ball) within the range of about 160 to about 240° F. and a needle penetration at 77° F. of about 20 to about 40. Preferably, the asphaltic component is an asphalt or a blend of asphalts of the foregoing properties having a negative oliensis. The oliensis of an asphaltic material, which may be either positive or negative is determinable by a test called the "Oliensis Asphalt Spot Test." This test is fully described in the American Association of State Highway Officials bulletin, entitled "Highway Materials," page 113 et seq., 1942. A most acceptable asphaltic bitumen for the compositions of the present invention is an asphalt or blend of asphalts, preferably virgin asphalt, characterized by a negative oliensis, a softening point (ring and ball) of about 190 to about 210° F., and a needle penetration at 77° F. of about 25 to about 35.

As indicated hereinabove, the asphaltic bitumen may be one asphalt obtained from a single source and having a softening point and penetration within the desired range. However, the asphaltic bitumen component may also be prepared by blending or amalgamating two or more asphalts to obtain a mixture in which the properties of each asphalt more or less balance off the other asphalt(s) in the mixture. For example, a plurality of asphaltic materials each having a softening point and penetration within the above-stated ranges may be used. Manifestly, the desired softening point and penetration can also be obtained by a mixing two or more asphaltic materials, at least one of which has a softening point and penetration outside the indicated ranges. For instance, the asphaltic material may comprise an amalgamated blend including an asphalt which is liquid at ambient temperatures, e.g., 70° F., and a natural asphaltite having a relatively high softening point, e.g., over 250° F. An admirably suitable asphaltic bitumen component for the compositions of the present invention is an amalgamated blend of the character just described. Specifically, said component includes a minor proportion of gilsonite with a softening point of about 300° F. and a major proportion of liquid asphalt. The liquid asphalt may be prepared by cutting back straight reduced asphalt with a suitable amount of solvent, e.g., one part of solvent per two parts of asphalt.

While the preparation of such cutbacks with aromatic solvents such as xylene is permissible and constitutes a recognized practice, it is preferred that the amount of aromatic solvents employed in the compositions of the invention be kept to minimum and that only such amount as is needed to render the asphalt cutbacks readily blendable with the gilsonite should be used. Further thinning for purposes of obtaining proper viscosity for application or other purposes, e.g., for preparing a sprayable composition, is performed with essentially aliphatic solvents in order that the odor and other problems associated with aromatic solvents may be avoided insofar as possible. When the asphaltic bitumen contains a solvent, the weight of such solvent may be considered a part of the weight of the solvent constituting the fourth component of the present invention and not as part of the asphalt.

The fact that the compositions of the present invention produce coatings marked by excellence in both physical properties and corrosion-resistance is attributed to the fact that the amount of water insoluble wax soap, in terms of weight, exceeds the amount of asphaltic material. It has been found that acceptable compositions may be produced through the use of about 20 to about 75 parts by weight of asphaltic material per 100 parts by weight of the soap.

The corrosion inhibitor constituting the third component of the compositions of the present invention may be any one of a wide variety of known materials which retard or inhibit or otherwise prevent the corrosion of ferrous metals. More particularly, the corrosion inhibitor is an oil soluble, water insoluble, strongly polar, hydrocarbon corrosion inhibitor. Many diverse types of materials falling within the above-described class are known to persons skilled in the art, including: metal salts of organic acids, such as salicylates, sulfonates, naphthenates, oleates, sulfonated and sulfated fixed fatty oils; amine salts or fatty acids, such as paramine oleate, dicyclohexylamine oleate, and oxazoline salts of sulfonic and ricinoleic acids; organic esters, such as dilauryl phosphate and dilauryl phosphite; organic amines, such as octadecylamines; organic amine phosphates, such as monomethyl amine phosphate, tertiary octyl amine phosphate and paraphenylene diamine phosphate; salts of inorganic acids, such as metal phosphates, methyl oleyl aluminum phosphate; substituted fatty acids, such as 1,10-dihydroxystearic acid; alkylated polycarboxylic acids, such as alkyl succinic and alkyl phthalic acids in which the alkyl groups contain at least 12 carbon atoms, and substituted aromatic acids, such as hydroxynaphthoic acid.

The preferred class of rust inhibitors are the oil soluble, water insoluble metallopetroleum sulfonate salts. These materials are effective in amounts of about 1 to 5 percent. The preferred salts are the alkali, alkaline earth and heavy metal salts. The cation portion of said salt, however, may be Na, K, Ce, Ca, Ba, Sr, Ng, Al, Zn, Ph, Sn, Ge, Zr, Cr, Cd, Co, Fe, Mo, Ni, Va, Bi and the like. The anion portion of the salt is a petroleum sulfonate.

Petroleum sulfonates may be obtained by sulphonating various petroleum hydrocarbon fractions with sulphuric acid, oleum, chlorosulphonic acid, sulphur trioxide and their mixtures. Petroleum hydrocarbons may be treated with sulphur dioxide and a halogen and the resultant product hydrolyzed and neutralized to produce sulphonated hydrocarbons. The petroleum hydrocarbons may be aliphatic, cyclic and/or aromatic and specifically may be gas oil, kerosene, light oil, turbine oil, mineral lubricating oil, heavy oil; generally any normally liquid petroleum hydrocarbon is suitable for the production of the sulphonates.

Particularly preferred among the applicable corrosion inhibitors are the sodium salts of mahogany acids. The mahogany acids are obtained by sulfonating, e.g., as with oleum, a heavy oil, which may be distillate fraction from a paraffinic, naphthenic or mixed base crude.

After removal from the oleum-treated products of the acid sludge which contains the water-soluble, so-called "green" acids, the mahogany acids may be separated and converted to the desired polyvalent metal salts by any convenient method such as by neutralizing them with sodium hydroxide, and extracting the salts thus formed from the oil with a solvent such as an aqueous alcohol solution.

The fourth component of the compositions of the present invention is a volatile solvent or mixture of solvents which has the ability to dissolve both the asphalt and the wax oxidate salt. By "volatile" solvent it is meant one having a sufficiently high vapor pressure at ambient temperatures to evaporate from the composition after application to leave a thin, firm film. Generally speaking, any light liquid hydrocarbon boiling below the lubricating oil range may be employed. Among the hydrocarbons falling in this range are toluene, xylene, kerosene, gasoline, naphtha, and chlorinated hydrocarbon solvents such as chloro benzene, trichloroethylene, ethylene dichloride and carbon tetrachloride. The rate of drying of compositions can be controlled by proper selection of the volatility of the solvent vehicle. For example, if a naphtha solvent is used, the resulting product is of the rapid-drying type, while if a kerosene fraction is used as the solvent vehicle, medium or slow-drying products result. A rapid drying solvent is preferred. The particularly preferred solvent is an essentially aliphatic hydrocarbon solvent boiling in the range of about 310° F. to about 365° F. and having Kauributanol number of about 33 to about 45.

The solvent should be present in the coating composition in at least sufficient amount to produce a sprayable composition. Preferably, the amount of solvent should be such as to provide a viscosity in the range of about $2 \times 10^5$ to about $3 \times 10^6$ cps., measured at 70° F. with a Brookfield LVT viscosimeter, number 4 spindle, operating at 60 r.p.m. For embodiments of the present compositions which are sprayable in airless spray guns the amount of solvent should be such as to provide a viscosity of about $4 \times 10^5$ to about $6 \times 10^5$ cps., measured as described above.

The organophilic modified clays comprising the fifth component of the compositions of the present invention are well known. They differ from the usual natural and synthetic clays in that they have been modified with organic cations which make them organophilic, which alter the natural tendency of such clays to absorb water and, in fact, render said clays capable of swelling in organic media.

The clays which may be modified in the above-described manner are those which exhibit cationic exchange properties. Preferably, the clays should have comparatively high exchange properties and should have cations which are capable of relatively easy replacement. Among the suitable clays or cation-exchangeable inorganic colloids are: natural clays, including the bentonites (e.g., Wyoming bentonite and montmorillonites-hectorite), beidellite, saponite, nontronite, sepiolite, biotite, attapulgite, vermiculite, and the zeolites (e.g. edingtonite, chabazite, natrolite and mordenites); synthetic clays, such as magnesia-silica-sodium oxide; lime-silica-potassium oxide, baria-silica-lithium oxide; and synthetic zeolites, such as the complex aluminum silicates with exchangeable cation, including those in which the exchangeable cation is hydrogen, sodium, potassium, barium, magnesium or ammonium.

In the preparation of the organophilic modified clays, the exchangeable inorganic cation of the natural or synthetic clay is replaced by one or more substituted organic onimum bases. This reaction is well known to persons skilled in the art and constitutes no part of the present invention. Generally speaking however, it is preferred that the onimum compounds be titratable with mineral acids. Among the reactive onimum base compounds are many alkaloids, and cyclic, aliphatic and heterocyclic amines. The onimum compounds are preferably aliphatic amines, their salts and quaternary ammonium salts. Examples of such amines and salts are: decylamine, dodecylamine, tetradecylamine, hexadecylamine, octadecylamine, hexadecyl ammonium acetate, octadecyl ammonium acetate, dimethyldidodecyl ammonium acetate, dimethylhexadecyloctadecyl ammonium acetate, dimethyldodecylhexadecyl ammonium acetate, dimethyldicetyl ammonium acetate, dimethyldioctyl ammonium acetate, dimethyldioctyl ammonium acetate, dimethyldioctadecyl ammonium acetate, and the corresponding chlorides and quaternary ammonium chlorides. The organic bases employed should be such as to impart substantial organophilic properties to the resulting compounds. The preferred bentonite compounds are prepared from quaternary ammonium compounds in which the N-substituents are aliphatic groups containing at least one alkyl group and having a total of at least 10 to 12 carbon atoms. When aliphatic amines are used they preferably contain an alkyl group with a total of at least 10 to 12 carbon atoms.

The amount of modified clay employed in the compositions of the invention should be sufficient to prevent dripping when the compositions are sprayed onto a vehicular underbody in a layer of considerable thickness, e.g., 6 to 8 mils. It has been found that about 5% by weight of the modified clay is sufficient to impart the desired characteristics to a composition which contains in addition to the clay, about 45% by weight of waxy hydrocarbon calcium soap, about 20% by weight of asphaltic bitumen, about 3% by weight of sodium mahogany acid sulfonate and 27% by weight of aliphatic solvent and having a viscosity of about $5 \times 10^5$ cps. at 70° F. (Brookfield). See Example 1. If the same ingredients referred to above are used in a composition of higher total solids content, it may be possible to reduce the amount of modified clay. Lower total solids contents generally call for more of the modified clay. In any event, persons skilled in the art will have no difficulty in manipulating the amount of modified clay in view of the above discussion.

The following table indicates broad and limited ranges of the various components to be employed in the compositions of the present invention, by weight percent:

| Component | Broad range (about) | Limited range (about) |
| --- | --- | --- |
| Waxy hydrocarbon soap | 35–55 | 40–50 |
| Asphaltic bitumen | 11–27 | 14–24 |
| Corrosion inhibitor | 1–5 | 2–4 |
| Organophilic modified clay | 3–10 | 4½–6½ |
| Light liquid hydrocarbon solvent | (¹) | 25–38 |

¹ As desired.

A specific embodiment of a preferred sprayable automotive undercoating composition in accordance with the invention is prepared as follows, all parts being given in terms of weight:

EXAMPLE 1

A highly paraffinic petrolatum from a Pennsylvania crude, having about 35 to about 70 carbon atoms per molecule is oxidized to an acid number of about 28.5. 44 parts of the waxy oxidate are heated to about 350° F. and are agitated while 2 parts of lime are incorporated. The resultant mixture is held under agitation at 350° F. for about an hour. Then, as the mixture is cooled, approximately 18 parts of an essentially aliphatic solvent boiling in the range of 310° F. to 365° F. are run into the mixture. The resultant cutback soap has a needle penetration of about 40 to 85 at 77° F. It is blended with a mixture of: (1) 16 parts liquid asphalt (Saybolt Furol viscosity 122) which is (a) 62% vacuum reduced asphalt having a negative oliensis, a softening point of 230° F. and a needle penetration at 77° F. of 40 and (b) 33% xylene; (2) 4 parts gilsonite, softening point 300° F.; (3) 3 parts of sodium mahogany acid sulfonate; and (4) about 9 parts of the aliphatic solvent mentioned above. The resultant blend is slurried with 5 parts of dimethyl dioctadecyl ammonium bentonite and one part methanol and is thoroughly mixed for one hour. 1 part of water is then added and the mixture is heated to 180° F. with agitation until the alcohol is driven off, e.g., one hour. The resultant material has a viscosity of $5 \times 10^5$ cps. at 70° F.

The following are examples of other compositions falling within the scope of the invention.

EXAMPLE 2

| Component: | Wt. percent |
|---|---|
| Petroleum wax soap (calcium base) | 45 |
| Liquid asphalt | 12 |
| Gilsonite | 3.0 |
| Sodium sulfonate from a naphthenic crude | 4.7 |
| Didodecyl ammonium bentonite | 5.0 |
| Aliphatic solvent, boiling at 310°–365° F. | 31.8 |
| Lead naphthenate | 1.0 |

EXAMPLE 3

| Component: | Wt. percent |
|---|---|
| Petroleum wax soap (barium base) | 39 |
| Vacuum reduced asphalt, softening point 180° F., needle penetration of 20 at 77° F. | 27 |
| Paramine oleate | 5 |
| Dimethyldihexdecylammonium bentonite | 4 |
| Naphtha | 25 |

EXAMPLE 4

| Component: | Wt. percent |
|---|---|
| Petroleum wax soap (mixed 50:50 zinc/calcium base) | 50 |
| Vacuum reduced asphalt, softening point 140° F. | 8 |
| Gilsonite, softening point 300° F. | 5 |
| Tertiary octylamine phosphate | 4 |
| Dimethyldidodecylammonium attapulgite | 5 |
| Trichloroethylene | 28 |

In order to determine the protective and physical properties possessed by the compositions of the present invention, a number of steel test panels were each uniformly coated with 8 mil layers of the composition of Example 1, or with one of various other commercially available automotive undercoating compositions. After the panels had dried firm at ambient temperature (16 hours at about 90° F.), various panels were subjected to each of the following tests:

Impact flexibility

A low temperature impact flexibility test was conducted on four sets of panels, one of which sets was coated with the composition of Example 1 herein, and the other three sets were each coated with one of three different well-known automotive undercoatings. All of the panels were cooled to −30° F. in a refrigerator and were removed therefrom one by one and immediately tested on the G.E. impact flexibility tester before any significant increase in panel temperature had occurred.

In accordance with the G.E. impact flexibility test, a solid metal cylinder is dropped through a guide track from a height of approximately four feet. This impacter strikes the reverse side of the coated test panel made of canstock tinplate, which is supported by a rubber pad so that the circular imprint of the impacter is barely definable in the panel metal. Each end of the impacter is studded with a group of protruding spherical knobs arranged in a circle. When the impacter strikes the panel, these knobs form their imprints under the film. The film is distended beyond its original plane according to the curvature of the spherical segment forming a given knob. The spherical segments are calibrated in terms of percent flexibility, based on the elongation or draw that they can produce in the metal panel. A reading is quickly made by observing the last indentation in ascending order to show no cracking of the undercoating film under test. It can be demonstrated mathematically that the actual elongation of the films is a function solely of the central angle defining the spherical segment, and is not dependent upon the thickness of the metal panel or other dimensions.

The results of this test were as follows:

| Series | Coating on panels | Elongation at failure, percent |
|---|---|---|
| 1 | Commercially available composition A | 2 |
| 2 | Commercially available composition B | 1 |
| 3 | Commercially available composition C | 60 |
| 4 | Composition of Example 1 herein | (¹) |

¹ No failures at 60%.

Salt fog test

In this test, four sets of test panels were continuously exposed at a constant temperature of 95° F. in a spray of atomized aqueous mist or fog having a salt (NaCl) concentration of 5% in accordance with Federal Test Method Standard 791A, Protection-Salt Spray (fog) Method 4001.1. Two sets of panels bore coatings of the commercially available coatings designated as A and C above. The third set of panels bore coatings of a commercially available undercoating designated as D. The fourth set of panels bore coatings of the composition of Example 1. After 720 hours of treatment, the panels were removed and examined. The appearance of the panels is described in the following table:

| Panel set | Coating composition | General description of appearance |
|---|---|---|
| 1 | A | Approximately 50% (in terms of surface area) of coating appeared destroyed and replaced by deep-seated corrosion of test panel. |
| 2 | C | Same as above. |
| 3 | D | Approximately 10-15% of coated portion of panel appeared corroded. Some corrosion appeared superficial. Apparent deep-seated corrosion along edge of coating. |
| 4 | Ex. 1 | No trace of corrosion-test extended to 2,900 hours without a trace of corrosion. |

Adhesion and sagging

In order to demonstrate the adhesion and sagging tendencies of compositions in accordance with the invention when subjected to elevated temperatures, such as are experienced when an automobile underbody is steam cleaned, 4 special sets of panels were prepared in which a ¾" wide strip of the surface of each panel is masked off with transparent cellophane tape. One set is coated with the composition of Example 1 and the others with the compositions referred to above as A, B, and C. The panels were air dried for 4 hours at ambient temperature (about 90° F.) and the cellophane tape was then stripped off to expose a clean area of equivalent width. Then the panels were suspended for 16 hours in an electrically heated oven with updraft air circulation at a temperature of about 285° F. Upon removal of the panels from the oven and observation of their appearance, it was noted that the panels with composition A seemed least affected by the heat. Although there was a slight flaking off of some of the coating material, the affected area was small, the coating as a whole remained relatively smooth, and there was no sagging. The coating composition of Example 1 was judged to present the next best appearance. The coating had a very wrinkled appearance after the heat treatment, but no film ruptures or sagging could be observed. The composition B coating developed pin holes, was somewhat wrinkled, and flaked off or peeled back from the panels in various places. The composition C coating sagged badly, running into the previously masked area.

Spraying characteristics

Spraying tests were conducted at ambient temperature (about 82° F.) to determine the spraying characteristics of compositions in accordance with the invention. A batch of the composition of Example 1 was cut with 10% of its own weight of stoddard solvent and sprayed at a tank pressure of about 80–85 p.s.i.g., a tip pressure of about 4000 p.s.i. through a gun with a variety of tips having openings ranging from .011″ to .021″ in diameter. An opening of .013″ was found to give an excellent, uniform spray pattern free of misting with a coating of medium thickness, e.g., 4 to 6 mils, being obtained in a single pass. By way of comparison, conventional undercoating compositions containing 20 to 25% of natural clay as filler are thought to require an opening of at least about .018″ when operating at the above pressures. Otherwise, clogging of the spray gun is experienced frequently enough to be quite inconvenient. Nevertheless, the use of smaller nozzle openings, such as are possible with the compositions of the present invention, is definitely beneficial for smaller openings inherently provide better spray control and more uniform coatings.

The commercially available undercoating compositions against which the compositions of the present invention have been compared in the above-described tests are, to the best of applicant's knowledge and belief, the best compositions now being made available for vehicular undercoating purposes on a large scale. It is therefore of interest to note that applicant's composition exhibits not only superior corrosion protection, as evidenced by the salt spray test, but also exhibits superior impact flexibility at low temperature, very good adhesion and sagging properties and excellent spraying characteristics, a combination of properties not found in any of the other compositions tested.

What is claimed is:

1. A coating composition comprising: a water-insoluble metal soap of a waxy hydrocarbon oxidate characterized by an acid number of at least about 20; about 20 to about 75 parts by weight per hundred parts of said soap, of asphaltic bitumen; at least about 1% based on the weight of the total composition of an oil soluble, water-insoluble, strongly polar, hydrocarbon-based corrosion inhibitor; a volatile organic solvent; and about 3 to about 10%, based on the weight of the total composition, of an organophilic modified clay having cationic exchange properties.

2. A coating composition comprising, in percent by weight of the total composition: a water-insoluble polyvalent metal soap of a waxy hydrocarbon oxidate characterized by an acid number of from about 20 to about 50 in an amount of about 35 to about 55%; an asphaltic bitumen in an amount of about 11 to about 27%; an oil-soluble, water-insoluble, strongly polar, hydrocarbon-based corrosion inhibitor in an amount of about 1 to about 5%; an organophilic modified clay having cationic exchange properties in an amount of about 3 to about 10%; and a volatile organic solvent in an amount sufficient to adjust said composition to a viscosity suitable for coating purposes.

3. A composition according to claim 2 wherein said asphaltic bitumen is characterized by having a softening point from about 160 to about 240° F. and a needle penetration at 77° F. from about 20 to about 40.

4. A composition according to claim 3 wherein said asphaltic bitumen is characterized by a negative oliensis.

5. A composition according to claim 4 wherein said asphaltic bitumen is a blend of including a major portion of a straight reduced asphalt and a minor portion of a natural asphaltite.

6. A composition according to claim 4 wherein said organic solvent is selected from the group consisting of hydrocarbon solvents, chlorinated hydrocarbon solvents and mixtures thereof.

7. A composition according to claim 6 wherein said clay is an organophilic modified bentonite.

8. A composition according to claim 7 wherein said modified bentonite is a quaternary ammonium modified bentonite wherein the N-substitution is aliphatic and contains at least one alkyl group with a total of at least 10 carbon atoms.

9. A composition according to claim 8 wherein said polyvalent metal is selected from the group consisting of Ca, Ba, Mg, Zn, Fe and Pb.

10. A composition according to claim 9 wherein said corrosion inhibitor is a metallo petroleum sulfonate salt, said polyvalent metal is calcium, and said waxy hydrocarbon oxidate is a petrolatum oxidate.

11. A composition according to claim 10 wherein said inhibitor is sodium mahogany acid sulfonate.

12. A composition according to claim 11 wherein the modified bentonite is dimethyldioctadecylammonium bentonite.

13. A composition according to claim 12 wherein said organic solvent is an essentially aliphatic hydrocarbon solvent boiling within the range of about 310° F. to about 365° F.

14. A coating composition comprising, in percent by weight of the total composition: a water-insoluble polyvalent metal soap of a waxy hydrocarbon oxidate characterized by an acid number of from about 20 to about 50 in an amount of about 40 to about 50%; an asphaltic bitumen in an amount of about 14 to about 24%; an oil soluble, water-insoluble, strongly polar, hydrocarbon-based corrosion inhibitor in an amount of about 2 to about 4 percent; an organophilic modified clay having cationic exchange properties in an amount of about 4.5 to about 6.5 percent; and a volatile organic solvent in an amount sufficient to obtain a composition having a viscosity suitable for coating purposes.

15. A composition according to claim 14 wherein said asphaltic bitumen has a negative oliensis, a softening point of about 160 to about 240° F., and a needle penetration at 77° F. of about 20 to about 40.

16. A composition according to claim 15 wherein asphaltic bitumen has a softening point of about 190° F. to about 210° F., and a needle penetration at 77° F. of about 25 to about 35; said polyvalent metal is selected from the group consisting of Ca, Ba, Mg, Zn, Fe, and Pb; and said hydrocarbon oxidate has an acid number of about 20 to about 35.

17. A composition according to claim 16 wherein said clay is an organophilic modified bentonite.

18. A composition according to claim 17 wherein said solvent is selected from the group consisting of hydrocarbon solvents, chlorinated hydrocarbon solvents, and mixtures thereof.

19. A composition according to claim 18 wherein the solvent is an essentially aliphatic hydrocarbon solvent boiling within the range of about 310° F. to about 365° F. and said inhibitor is a metallo petroleum sulfonate salt.

20. A composition according to claim 19 wherein said clay is a quaternary ammonium modified bentonite wherein the N-substitution is aliphatic and contains at least one alkyl group with a total of at least 10 carbon atoms.

21. A composition according to claim 20 wherein said clay is dimethyl dioctadecyl ammonium bentonite and said inhibitor is sodium mahogany acid sulfonate.

22. A composition according to claim 21 wherein said polyvalent metal is calcium and said hydrocarbon oxidate is an oxidate obtained from a petrolatum having an average of about 35 to about 70 carbon atoms per molecule.

23. A composition of matter comprising: in parts by weight, about 45 parts of a water insoluble calcium soap of a petrolatum oxidate characterized by an acid number of about 28.5, said soap having a penetration at 77° F. of about 40 to about 85; about 20 parts of an asphaltic bitumen including (1) 16 parts liquid asphalt having a Saybolt Furol viscosity of 122 which includes (a) 62% by weight of a vacuum reduced asphalt having a negative oliensis, a softening point of about 230° F. and a needle penetration at 77° of about 40 and (b) 38 percent by weight of xylene and (2) 4 parts of gilsonite having a softening point of about 300° F.; about 3 parts of sodium mahogany acid sulfonate; about 5 parts of dimethyldioctadecylammonium bentonite; and about 27 parts of an essentially aliphatic solvent boiling in the range of about 310° F. to about 365° F.

References Cited

UNITED STATES PATENTS

| | | | |
|---|---|---|---|
| 2,375,055 | 5/1945 | Weetman et al. | 106—269 XR |
| 2,615,815 | 10/1952 | Galvin et al. | 106—14 |
| 2,805,954 | 9/1957 | Fair | 106—278 |
| 2,861,892 | 11/1958 | Radd et al. | 106—14 |
| 2,932,579 | 4/1960 | Westlund et al. | 106—14 XR |
| 2,973,279 | 2/1961 | Weidenbenner et al. | 106—281 XR |
| 3,274,016 | 9/1966 | Rogers et al. | 106—281 |
| 3,293,050 | 12/1966 | Lawrence | 106—14 |

FOREIGN PATENTS 519,119  3/1940  Great Britain.

JULIUS FROME, *Primary Examiner.*

L. B. HAYES, *Assistant Examiner.*

U.S. Cl. X.R.

106—278, 280; 117—135; 252—388